(12) United States Patent
Van Nieuwstadt et al.

(10) Patent No.: US 11,603,787 B2
(45) Date of Patent: Mar. 14, 2023

(54) METHODS AND SYSTEM FOR CONTROLLING SELECTIVE CATALYTIC REDUCTANT CATALYST OF A GASOLINE ENGINE

(71) Applicant: Ford Global Technologies, LLC, Dearborn, MI (US)

(72) Inventors: Michiel J. Van Nieuwstadt, Ann Arbor, MI (US); Michael Uhrich, Wixom, MI (US); Timothy R. Gernant, Ann Arbor, MI (US); Giovanni Cavataio, Dearborn, MI (US); Joseph Thomas, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/107,734

(22) Filed: Nov. 30, 2020

(65) Prior Publication Data
US 2022/0170400 A1 Jun. 2, 2022

(51) Int. Cl.
*F01N 3/20* (2006.01)
*F02D 41/02* (2006.01)
(Continued)

(52) U.S. Cl.
CPC ......... *F01N 3/208* (2013.01); *B01D 53/9418* (2013.01); *B01D 53/9445* (2013.01);
(Continued)

(58) Field of Classification Search
CPC ........ F01N 3/206; F01N 3/2066; F01N 3/208; F01N 3/0871; F01N 3/0864; F01N 3/101; F01N 11/007; F01N 2570/16; F01N 2560/025; F01N 2610/00; F01N 2610/01; F01N 2610/02; F01N 2610/03; F01N 2610/04; F01N 2610/05; F01N 2610/06; F01N 2610/102; F01N 2610/1453; F01N 2610/146; F01N 2900/18; F01N 2900/1806; F01N 2900/1602; F01N 2900/1624; F01N 2900/1626; F01N 2900/0416; F01N 2900/0418; F01N 2900/0421; F01N 2900/1402; F01N 2900/1411;
(Continued)

(56) References Cited

U.S. PATENT DOCUMENTS 8,661,788 B2  3/2014  Qi et al.
8,931,257 B2  1/2015  Narayanaswamy et al.
(Continued)

OTHER PUBLICATIONS

Uhrich, M. et al., "Methods and Systems for an Aftertreatment System," U.S. Appl. No. 16/918,720, filed Jul. 1, 2020, 33 pages.

*Primary Examiner* — Devon C Kramer
*Assistant Examiner* — Kelsey L Stanek
(74) *Attorney, Agent, or Firm* — Vincent Mastrogiacomo; McCoy Russell LLP

(57) ABSTRACT

Systems and methods for controlling a gasoline urea selective catalytic reductant catalyst are described. In one example, an observer is provided that corrects an estimate of an amount of $NH_3$ that is stored in a SCR. The amount of $NH_3$ that is stored in the SCR is a basis for generating additional $NH_3$ or ceasing generation of $NH_3$.

12 Claims, 5 Drawing Sheets

(51) Int. Cl.
  *F02D 41/14* (2006.01)
  *F01N 3/10* (2006.01)
  *B60Q 9/00* (2006.01)
  *F02D 41/40* (2006.01)
  *F02P 5/14* (2006.01)
  *B01D 53/94* (2006.01)

(52) U.S. Cl.
  CPC ........... *B01D 53/9495* (2013.01); *B60Q 9/00* (2013.01); *F01N 3/101* (2013.01); *F02D 41/0235* (2013.01); *F02D 41/1441* (2013.01); *F02D 41/1459* (2013.01); *F02D 41/401* (2013.01); *F02P 5/14* (2013.01); *B01D 2255/911* (2013.01); *F01N 2610/02* (2013.01); *F01N 2900/1402* (2013.01); *F01N 2900/1411* (2013.01); *F01N 2900/1602* (2013.01); *F01N 2900/1616* (2013.01); *F02D 2041/1468* (2013.01)

(58) Field of Classification Search
  CPC ..... F01N 2900/1616; F02D 2200/0802; F02D 41/042; F02D 41/045; F02D 41/06; F02D 41/107; F02D 41/10; F02D 41/12; F02D 41/0275; F02D 41/065; F02D 41/1454; F02D 41/1439; F02D 41/1441; F02D 41/1459; F02D 41/401; F02D 2041/1468; F02D 11/00; F02D 11/08; F02D 11/0814; F02D 11/0818; F02D 11/0829; F02D 11/0844; F02D 11/0848; F02D 11/0851; F02D 11/0855; B01D 53/90; B01D 53/94; B01D 53/9418; B01D 53/9422; B01D 53/9436; B01D 53/9445; B01D 53/9495; F02P 5/14

See application file for complete search history.

(56) References Cited

U.S. PATENT DOCUMENTS

| | | | |
|---|---|---|---|
| 9,163,543 | B2 | 10/2015 | Cavataio et al. |
| 9,181,835 | B2 | 11/2015 | Aliyev |
| 2009/0308058 | A1* | 12/2009 | Iida ........................ F01N 11/007 60/287 |
| 2011/0138779 | A1* | 6/2011 | Neumayer .............. F01N 3/208 60/274 |
| 2012/0310507 | A1 | 12/2012 | Auckenthaler |
| 2014/0012486 | A1* | 1/2014 | Fey ..................... F02D 41/1475 701/103 |
| 2014/0144125 | A1* | 5/2014 | Cavataio ............. F02D 41/1456 60/285 |
| 2014/0157760 | A1* | 6/2014 | Tufail .................... F02M 26/00 60/274 |
| 2017/0363029 | A1* | 12/2017 | Boerensen .......... F02D 41/0275 |
| 2019/0284981 | A1 | 9/2019 | Neri et al. |

* cited by examiner

METHODS AND SYSTEM FOR CONTROLLING SELECTIVE CATALYTIC REDUCTANT CATALYST OF A GASOLINE ENGINE

FIELD

The present description relates to methods and a system for controlling storage of $NH_3$ in a selective catalytic reductant catalyst. The methods and systems may be particularly useful for vehicles that include a gasoline engine and a three-way catalyst.

BACKGROUND AND SUMMARY

A vehicle may include a three-way catalyst to convert hydrocarbons, CO, and NOx to $H_2O$, $CO_2$, and $N_2$. The three-way catalyst may generate $NH_3$ when engine exhaust gases are richer than stoichiometric exhaust gases for combusting gasoline. The $NH_3$ may be oxidized in the exhaust system downstream of the three-way catalyst to form NOx. A selective catalytic reductant catalyst (SCR) may be positioned in an exhaust system downstream of the three-way catalyst to store the $NH_3$ and convert it to $N_2$ and $H_2O$ via the $NH_3$ reacting with NOx. However, the $NH_3$ may slip past the SCR and exit to atmosphere or NOx may not be converted if the SCR storage of $NH_3$ is too low. Therefore, it may be desirable to determine and control an amount of $NH_3$ stored in a SCR.

The inventors herein have recognized the above-mentioned issues and have developed a method for operating an engine, comprising: estimating an amount of $NH_3$ stored in a selective catalytic reductant catalyst (SCR) via a controller; correcting the amount of $NH_3$ stored in the SCR via the controller in response to output of first oxygen sensor and output of a second oxygen sensor; and adjusting an amount of fuel injected to an engine via the controller according to the corrected amount of $NH_3$ stored in the SCR.

By estimating an amount of $NH_3$ slip past a SCR according to output of a first oxygen sensor and output of a second oxygen sensor, it may be possible to provide the technical result of correcting output of a $NH_3$ storage model for a SCR. In particular, times of upstream (e.g., a catalyst monitor oxygen sensor) oxygen sensor switching and downstream (e.g., a tail pipe oxygen sensor) oxygen sensor switching may be indicative of $NH_3$ slip past a SCR when a temperature of the SCR is increasing. The $NH_3$ slip may be used as a basis for correcting the $NH_3$ storage model so that an amount of $NH_3$ stored in a SCR may be held in a desired operating range.

The present description may provide several advantages. In particular, the approach may improve NOx emissions control for gasoline vehicles. In addition, the approach may be implemented at lower cost than systems that rely on NOx sensors. Further, the approach may be implemented in different ways, thereby permitting design flexibility.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
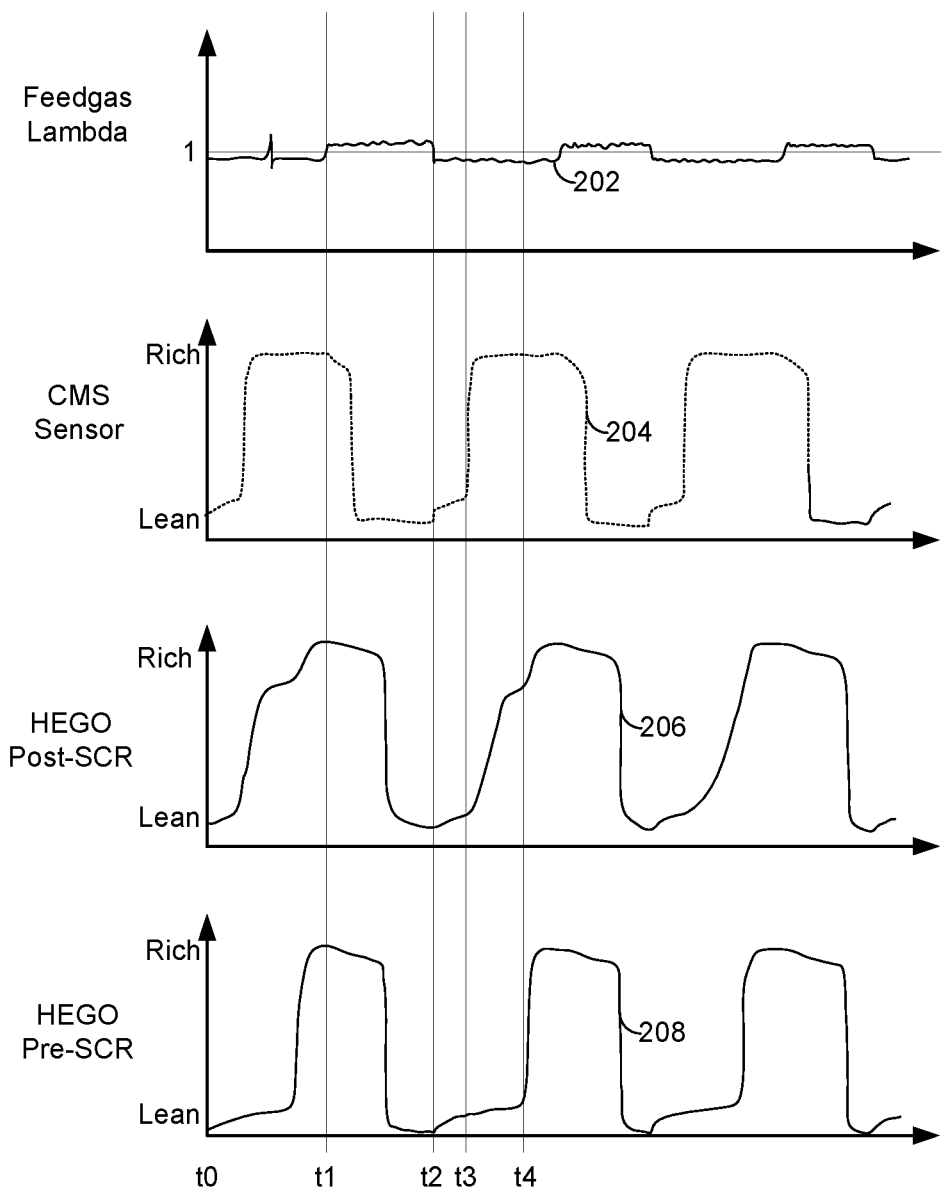
FIGS. 2 and 3 show oxygen sensor switching sequences.
Figure 3:
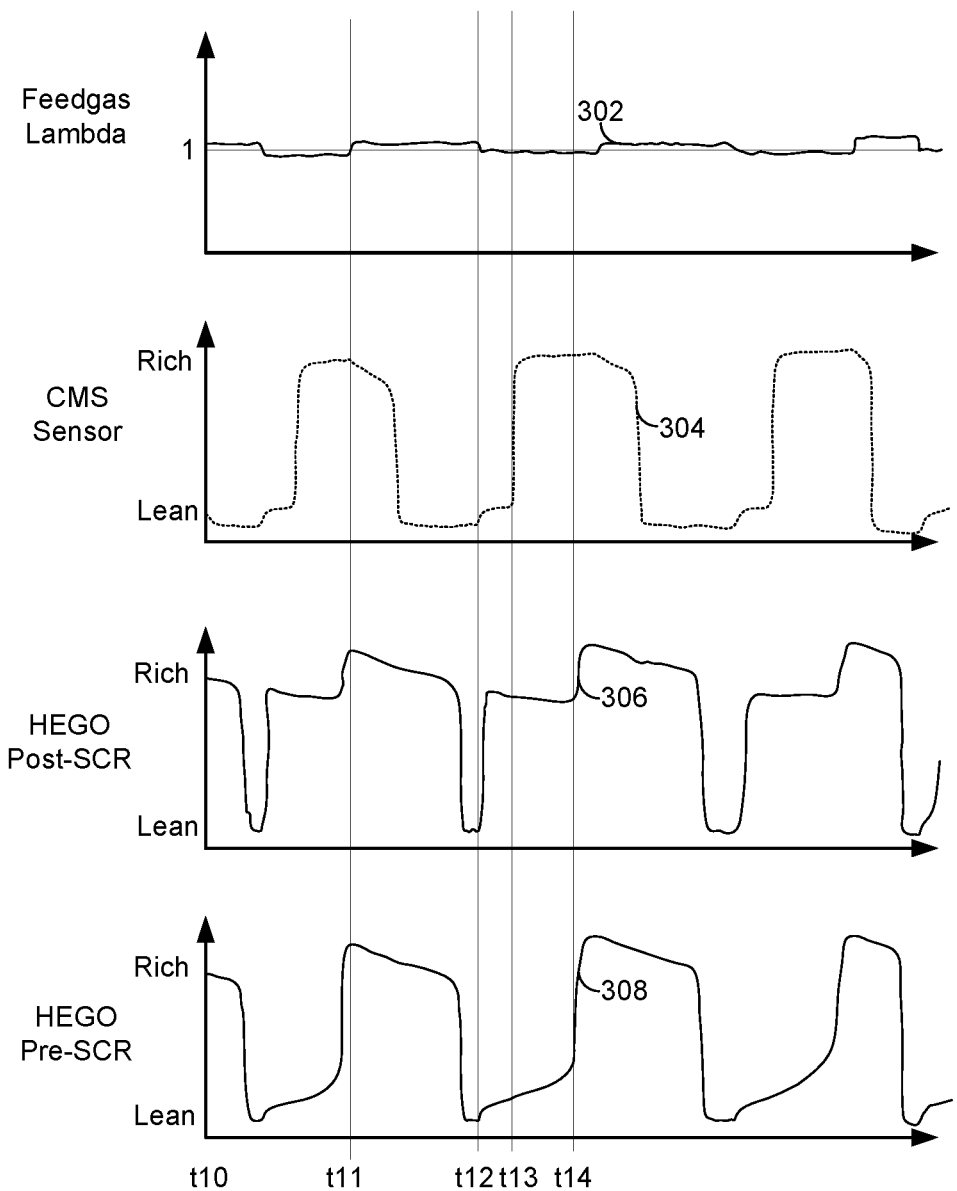
Figure 5:
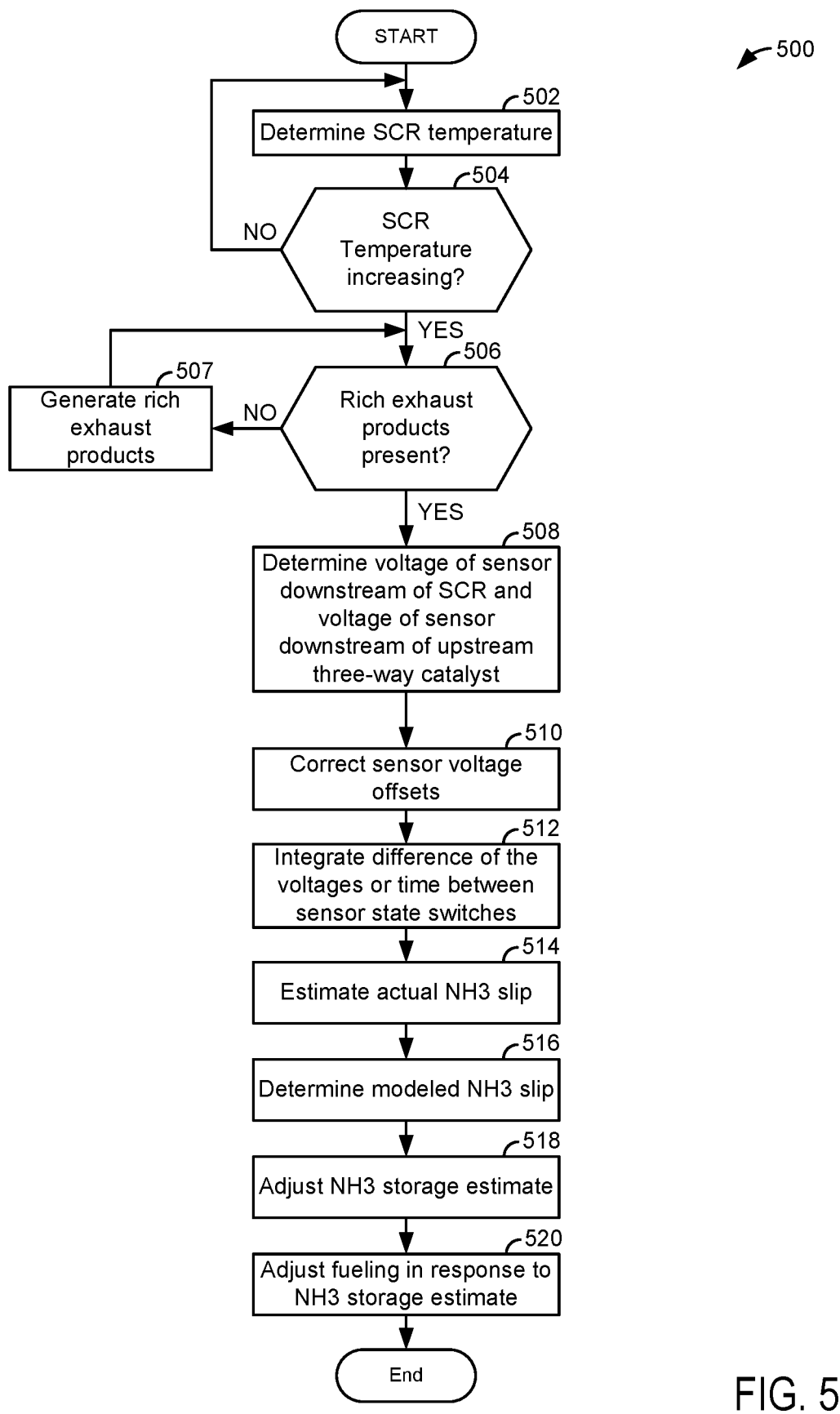
FIG. 5 shows a flowchart of a first method for controlling NOx and $NH_3$ of a gasoline vehicle that is equipped with a SCR and two oxygen sensors.
Figure 6:
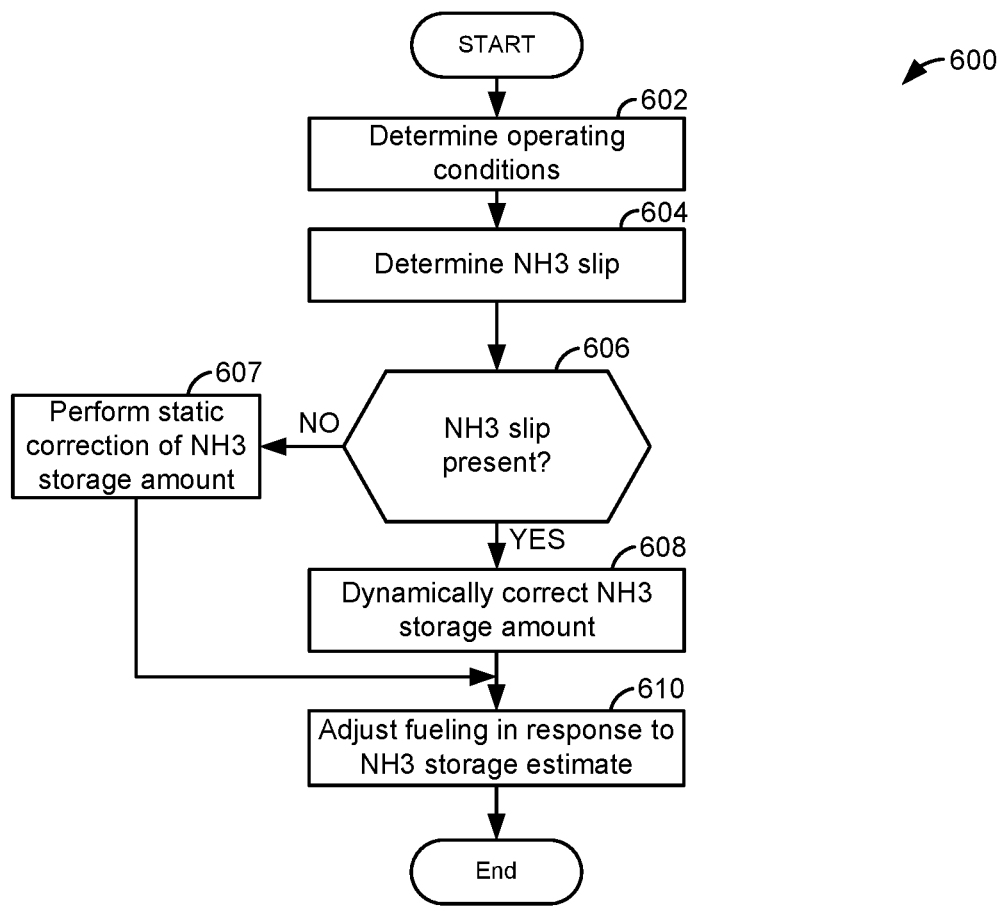
FIG. 6 shows a flowchart of a first method for controlling NOx and $NH_3$ of a gasoline vehicle that is equipped with a SCR and a NOx or $NH_3$ sensor.

The present description is related to improving control of NOx emitted from an engine. The engine may include an after treatment system that includes a three-way catalyst and a SCR. The SCR may be positioned downstream from one or more three-way catalyst in a direction of exhaust flow. The SCR may store $NH_3$ and convert the $NH_3$ to $N_2$ and $H_2O$ via NOx that enters the SCR. The engine may be of the type shown in FIG. 1. In one example, storage of $NH_3$ may be based on slip of $NH_3$ through the SCR as inferred from two oxygen sensors. In other examples, storage of $NH_3$ may be based on slip of $NH_3$ through the SCR as inferred from a NOx or $NH_3$ sensor. FIGS. 2 and 3 show oxygen sensor switching sequences to illustrate how output of two oxygen sensors may be a basis for determining $NH_3$ slip through the SCR. Outputs of two oxygen sensors are plotted side by side in FIG. 4 to show an area between curves that may be indicative of $NH_3$ slip past an SCR. FIGS. 5 and 6 show two methods for controlling NOx and $NH_3$ of a vehicle. The methods may model $NH_3$ storage and correct output of an $NH_3$ storage model via an observer.

Figure 1:
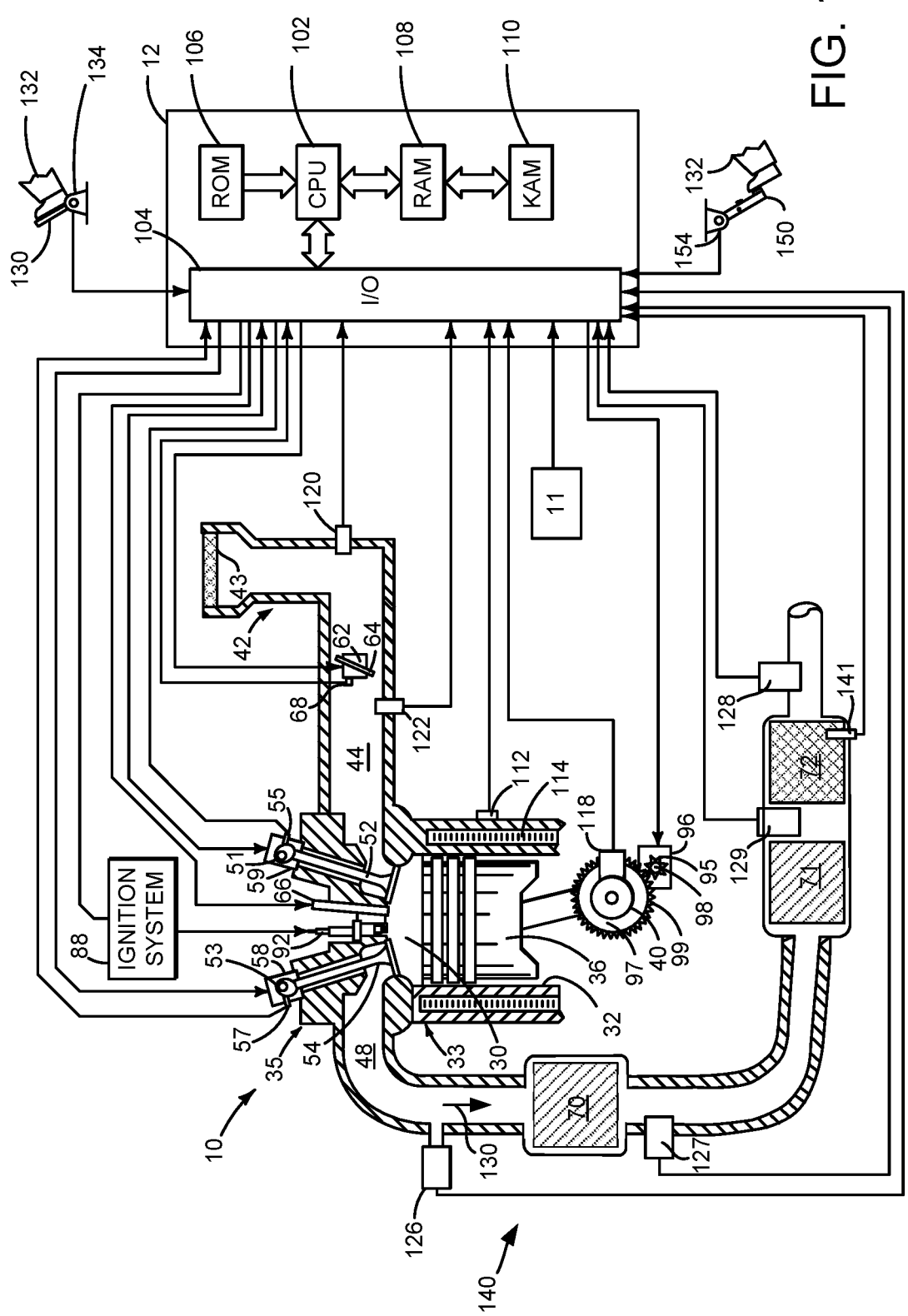
FIG. 1 is a schematic diagram of an engine and after treatment system.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIG. 1. The controller may employ the actuators shown in FIG. 1 to adjust engine operation based on the received signals and instructions stored in memory of controller 12.

Engine 10 is comprised of cylinder head 35 and block 33, which include combustion chamber 30 and cylinder walls 32. Combustion chamber 30 may alternatively be referred to as a cylinder. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99 and crankshaft 40. Ring gear 99 is directly coupled to crankshaft 40. Starter 96 may be directly mounted to the front of the engine or the rear of the engine. In some examples, starter 96 may selectively supply torque to crankshaft 40 via a belt or chain. In one example, starter 96 is in a base state when it is not engaged to the engine crankshaft 40.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. The intake and exhaust valves may be deactivated in a closed position so that the intake and exhaust valves do not open during a cycle of the engine (e.g., four strokes). Valve activation devices 58 and 59 may be electro-mechanical devices.

Fuel injector 66 is shown protruding into combustion chamber 30 and it is positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

Optional electronic throttle 62 adjusts a position of throttle plate 64 to control air flow to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of light-off three-way catalytic converter 70. Alternatively, a two-state heated exhaust gas oxygen (HEGO) sensor may be substituted for UEGO sensor 126. A second HEGO sensor, which may be referred to as a catalyst monitor sensor (CMS) 127 is positioned in after treatment system 140 downstream of light-off three-way catalyst 70 according to a direction of exhaust flow as indicated by arrow 130. A third sensor 128, which may be a HEGO, NOx, or $NH_3$ sensor, is positioned downstream of second three-way catalyst 71 and SCR 72. In some examples, a pre-SCR oxygen sensor 129 may be provided and it may be positioned in after treatment system 140 downstream of three-way catalyst 71 and upstream of SCR 72. Temperature of the SCR may be determined via temperature sensor 141.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a propulsive force pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device. Controller 12 may also automatically start engine 10 in response to vehicle and engine operating conditions. Automatic engine starting may include starting engine 10 without input from human 132 to a device that is dedicated to receive input from human 132 for the sole purpose of starting and/or stopping rotation of engine 10 (e.g., a key switch or pushbutton). For example, engine 10 may be automatically stopped in response to driver demand torque being less than a threshold and vehicle speed being less than a threshold.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a system, comprising: an engine; a three-way catalyst in an exhaust system of the engine; a selective catalytic reductant catalyst (SCR) positioned in the exhaust system at a location downstream of the three-way catalyst; a sensor positioned in the exhaust system at a location downstream of the SCR; and a controller including executable instructions stored in non-transitory memory that cause the controller to generate a correction value for an amount of $NH_3$ stored in the SCR based on a difference between output of the sensor and output of a $NH_3$ storage model, and instructions to adjust the output of the $NH_3$ storage model according to the difference and adjust an amount of fuel supplied to the engine responsive to output of the $NH_3$ storage model. The system includes where the sensor is a $NH_3$ sensor or a NOx sensor. The system further comprises additional instructions to adjust the output of the $NH_3$ storage model according to the correction value. The system includes where the $NH_3$ storage model is based on an exhaust gas Lambda value, SCR temperature, and exhaust flow rate. The system further comprises additional instructions to integrate output of the $NH_3$ storage model. The system includes where the $NH_3$ storage model is further based on an amount of NOx flowing into the SCR.

Regarding FIG. 2, it shows switching of oxygen sensors in after treatment system 140 responsive to changes in engine air-fuel or Lambda values (e.g., Lambda=engine air-fuel ratio/stoichiometric air-fuel ratio). FIG. 2 shows oxygen sensor switching due to Lambda switching from rich to lean and vice-versa without $NH_3$ desorption (e.g., $NH_3$ slip) from the SCR.

The inventors have observed that an oxygen concentration observed by a downstream oxygen sensor that is positioned downstream of a SCR drops to a low level (e.g., 0) in response to a lean to rich engine air-fuel ratio switch. The output of the oxygen sensor that is positioned downstream of the SCR switches or changes state even before the oxygen storage of the upstream three-way catalyst and downstream three-way catalyst is depleted, which would cause a state change in the catalyst monitor oxygen sensor. If the lean to rich air-fuel ratio switch coincides with $NH_3$ release, such as the inventors herein may expect during a positive SCR temperature increase transient, $H_2$ generated from release of $NH_3$ or $NH_3$ itself may cause the downstream or tailpipe oxygen sensor to switch or change state before the catalyst monitor oxygen sensor switches state. The catalyst monitor oxygen sensor switches after the tailpipe oxygen sensor because the catalyst monitor oxygen sensor has to wait for reductant to deplete the oxygen storage in the upstream catalyst before the oxygen concentration in the exhaust gases cause it to switch state. The tailpipe oxygen sensor does not have to wait for oxygen depletion in the upstream catalyst to switch or change state due to the lean to rich air-fuel ratio change because the tailpipe oxygen sensor switches or changes state in response to $H_2$ from $NH_3$ or NH3 itself.

The first plot from the top of FIG. 2 is a plot of engine Lambda (e.g., the Lambda value of the air and fuel mixture that is being combusted by the engine) versus time. The vertical axis represents engine Lambda and engine Lambda is less than one (e.g., rich) when trace 202 is below the label 1 on the vertical axis. Engine Lambda is greater than one (e.g., lean) when trace 202 is above the label 1 on the vertical axis. The horizontal axis represents time and time increases from the left side of the figure to the right side of the figure. Trace 202 represents the engine Lambda value.

The second plot from the top of FIG. 2 is a plot of output voltage of the CMS (e.g., 127 of FIG. 1) versus time. The vertical axis represents CMS voltage and CMS voltage increases in the direction of the vertical axis arrow. The CMS voltage at the level of the horizontal axis is zero. The horizontal axis represents time and time increases from the left side of the figure to the right side of the figure. Trace 204 represents the CMS voltage.

The third plot from the top of FIG. 2 is a plot of output voltage of a tailpipe or post-SCR sensor (e.g., 128 of FIG. 1) versus time. The vertical axis represents post-SCR sensor voltage and post SCR voltage increases in the direction of the vertical axis arrow. The post-SCR voltage at the level of the horizontal axis is zero. The horizontal axis represents time and time increases from the left side of the figure to the right side of the figure. Trace 206 represents the post-SCR voltage.

The fourth plot from the top of FIG. 2 is a plot of output voltage of a pre-SCR sensor (e.g., 129 of FIG. 1) versus time. The vertical axis represents pre-SCR sensor voltage and pre-SCR voltage increases in the direction of the vertical axis arrow. The pre-SCR voltage at the level of the horizontal axis is zero. The horizontal axis represents time and time increases from the left side of the figure to the right side of the figure. Trace 208 represents the pre-SCR voltage.

The output voltages of the CMS, post-SCR oxygen sensor, and pre-SCR oxygen sensor exhibit very high gains in when the oxygen sensors are exposed to Lambda=1 exhaust gases. The gain is so high that the oxygen sensor output voltage may be described as "switching" when the engine Lambda changes from rich to lean or vice-versa. The switching of the oxygen sensor may also be referred to as the oxygen sensor changing state from indicating lean (e.g., a lower voltage–voltage less than 0.4 volts) to indicating rich (e.g., a higher voltage–voltage greater than 0.6 volts) and vice-versa.

At time t0, the engine Lambda value has changed from a rich value (e.g., 0.9) to a lean value (e.g., 1.1). The CMS, post-SCR oxygen sensor, and pre-SCR oxygen sensor voltages are all indicating lean, but the voltages are increasing toward a rich indication.

At time t1, the engine Lambda value is changed from a rich value to a lean value. The CMS, post-SCR oxygen sensor, and pre-SCR oxygen sensor voltages are all indicating rich. Shortly thereafter, the CMS, post-SCR oxygen sensor, and pre-SCR oxygen sensor voltages are all indicating lean. The CMS switches from lean to rich first followed by the pre and post SCR oxygen sensors.

At time t2, the engine Lambda value is changed from lean to rich. The CMS switches from rich to lean at time t3. The post-SCR oxygen sensor switches next between time t3 and time t4, and the pre-SCR oxygen sensor switches last at time t4. Thus, it may be observed that the post-SCR oxygen sensor switches from indicating lean to indicating rich after the CMS switches from indicating lean to indicating rich when $NH_3$ slip is not present. $NH_3$ slip may not be present when SCR temperature is decreasing because storage capacity for $NH_3$ increases in the SCR as SCR temperature decreases. Accordingly, $NH_3$ storage capacity of the SCR decreases as temperature of the SCR increases.

Regarding FIG. 3, it shows switching of oxygen sensors in after treatment system 140 responsive to changes in engine air-fuel or Lambda values. FIG. 3 shows oxygen sensor switching due to Lambda switching from rich to lean and vice-versa with $NH_3$ desorption from the SCR.

The first plot from the top of FIG. 3 is a plot of engine Lambda versus time. The vertical axis represents engine Lambda and engine Lambda is less than one (e.g., rich) when trace 302 is below the label 1 on the vertical axis. Engine Lambda is greater than one (e.g., lean) when trace 302 is above the label 1 on the vertical axis. The horizontal axis represents time and time increases from the left side of the figure to the right side of the figure. Trace 302 represents the engine Lambda value.

The second plot from the top of FIG. 3 is a plot of output voltage of CMS sensor (e.g., 127 of FIG. 1) versus time. The vertical axis represents CMS sensor voltage and CMS voltage increases in the direction of the vertical axis arrow. The CMS voltage at the level of the horizontal axis is zero.

The horizontal axis represents time and time increases from the left side of the figure to the right side of the figure. Trace 304 represents the CMS voltage.

The third plot from the top of FIG. 3 is a plot of output voltage of a tailpipe or post-SCR sensor (e.g., 128 of FIG. 1) versus time. The vertical axis represents post-SCR sensor voltage and post SCR voltage increases in the direction of the vertical axis arrow. The post-SCR voltage at the level of the horizontal axis is zero. The horizontal axis represents time and time increases from the left side of the figure to the right side of the figure. Trace 306 represents the post-SCR voltage.

The fourth plot from the top of FIG. 3 is a plot of output voltage of a pre-SCR sensor (e.g., 129 of FIG. 1) versus time. The vertical axis represents pre-SCR sensor voltage and pre-SCR voltage increases in the direction of the vertical axis arrow. The pre-SCR voltage at the level of the horizontal axis is zero. The horizontal axis represents time and time increases from the left side of the figure to the right side of the figure. Trace 308 represents the pre-SCR voltage.

At time t10, the engine Lambda value is lean. The CMS is indicating lean and the post-SCR oxygen sensor and the pre-SCR oxygen sensor voltages are all indicating rich.

At time t11, the engine Lambda value is changed from a rich value to a lean value. The CMS, post-SCR oxygen sensor, and pre-SCR oxygen sensor voltages are all indicating rich. Shortly thereafter, the CMS switches lean followed by the post-SCR oxygen sensor and the pre-SCR oxygen sensor switching lean before time t12.

At time t12, the engine Lambda value is changed from lean to rich. The post-SCR oxygen sensor switches rich coincident with time t12 or just after time t12. The CMS continues to indicate lean. The pre-SCR oxygen sensor also continues to indicate lean.

At time t13, the engine Lambda value continues on at a rich value. The post-SCR oxygen sensor continues to indicate rich conditions due to $H_2$ generated from $NH_3$ or from $NH_3$ itself released from the SCR. The CMS sensor switches from indicating lean to indicating rich. The pre-SCR oxygen sensor continues to indicate lean conditions.

The amount of time between time t12 (e.g., the switching time of the post-SCR oxygen sensor from lean to rich) and time t13 may be a basis for estimating $NH_3$ slip through the SCR. Alternatively, an area between curve 306 and curve 304 between time t12 and time t13 may be a basis for estimating $NH_3$ slip through the SCR as shown in FIG. 4.

At time t14, the engine Lambda value continues on at a rich value. The post-SCR oxygen sensor continues to indicate rich conditions due to $H_2$ generated from $NH_3$ or from $NH_3$ itself released from the SCR. The CMS sensor continues to indicate rich and the pre-SCR switches from indicating lean to indicating rich.

Thus, the inventors have established a way to estimate $NH_3$ slip via output of two oxygen sensors. In addition, as discussed in further detail below, the inventors have developed a way of correcting output of a $NH_3$ storage model for a SCR based on the $NH_3$ slip estimate.

Figure 4:
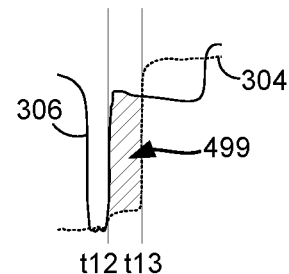
FIG. 4 is a plot showing how outputs of two oxygen sensors may be a basis for estimating slip of $NH_3$ through a SCR.

Referring now to FIG. 4, curves 304 and 306 from FIG. 3 are placed side by side to indicate an area between times t12 and t13 that may be indicative of $NH_3$ slip through the SCR. FIG. 4 shows a cross hatched area 499 between curves 306 and 304 in the time frame between time t12 and time t13. This area may be empirically mapped to an amount of $NH_3$ slip through the SCR. Alternatively, the amount of time between time t12 and time t13 may be empirically mapped to an amount of $NH_3$ slip through the SCR.

Referring now to FIG. 5, a method for controlling NOx and $NH_3$ of a gasoline vehicle that is equipped with a SCR and two oxygen sensors that is based on a first observer is shown. The method of FIG. 5 may be incorporated into and may cooperate with the system of FIG. 1. Further, at least portions of the method of FIG. 5 may be incorporated as executable instructions stored in non-transitory memory of controller 12 while other portions of the method may be performed via a controller transforming operating states of devices and actuators in the physical world.

At 502, method 500 determines operation conditions. Operating conditions may include but are not limited to ambient temperature, engine temperature, engine speed, barometric pressure, engine intake manifold temperature, SCR temperature, operating states of oxygen sensors, NOx sensors, and $NH_3$ sensors, and driver demand torque. The engine operating conditions may be determined via the various sensors described herein. Method 500 proceeds to 504.

At 504, method 500 judges if a temperature of the SCR is increasing. If so, the answer is yes and method 500 proceeds to 506. Otherwise, the answer is no and method 500 returns to 502. Alternatively, if the answer is no, method 500 may exit and execute again at a later time (e.g., 250 milliseconds later). Increasing SCR temperature may be indicative of reduced $NH_3$ storage capacity and $NH_3$ desorption from the SCR.

At 506, judges if a switch from lean feedgas exhaust gases to rich feedgas exhaust gases is present. In other words, method 500 judges if the engine has switched from operating with a lean air-fuel ratio to operating with a rich air-fuel ratio. Method 500 may determine a switch from lean feedgas exhaust gases to rich feedgas exhaust via UEGO 126. The switch from lean feedgas exhaust gases to rich feedgas exhaust gases may allow $NH_3$ slip through a SCR to be determined via output of two oxygen sensors. If method 500 determines that there is a switch from lean feedgas exhaust gases to rich feedgas exhaust gases, the answer is yes and method 500 proceeds to 508. Otherwise, the answer is no and method 500 proceeds to 507.

At 507, method 500 generates a switch from the engine producing lean feed gases to the engine producing rich feed gases. A switch from lean feedgas exhaust to rich feedgas exhaust may be provided via closed loop fuel control ramp and jump back techniques that stimulate three-way catalyst operation. Alternatively, a lean to rich switch may be generated when cylinders are reactivated after exiting a fuel cut-out mode. Further, a leant to rich switch may be generated during fuel enrichment to control catalyst temperature. Further still, method 500 may generate a transition from generating lean exhaust gases to generating rich exhaust gases in response to a request to correct output of a $NH_3$ storage model. The switch from generating lean feed gases to generating rich feed gases may be providing by increasing an amount of fuel that is injected to the engine. Method 500 returns to 506.

At 508, method 500 determines an output voltage from a tailpipe oxygen sensor that is positioned in after treatment system 140 downstream of the SCR in the direction of exhaust gas flow. Method 500 also determines output voltage of an oxygen sensor that is positioned downstream of a three-way catalyst (e.g., CMS sensor 127). The output voltages may be determined via the controller. Method 500 proceeds to 510.

At 510, method 500 corrects for offsets that may be in the voltages output from the two oxygen sensors that output the voltages determined at 508. Oxygen sensors may exhibit offsets at times due to sensor temperature changes, sensor contamination, and/or sensor aging. Method 500 may remove these offsets via determining a lowest oxygen sensor voltage over a predetermined time period and adding an offset voltage to determined oxygen sensor output voltages that move the lowest voltage value to a predetermined voltage level. For example, if over a two minute period a lowest observed oxygen sensor voltage is −0.2 volts and a desired lowest oxygen sensor voltage is 0 volts, then 0.2 volts may be added to each voltage level that is output by the subject oxygen sensor and input to the controller. Of course, other ways of removing sensor offsets may also be applied. Method 500 proceeds to 512.

At 512, method 500 integrates an area between the offset voltage adjusted voltages output from the two oxygen sensors as determined at 510. In one example, the area that is integrated begins at the time when the tailpipe oxygen sensor switches from indicating lean to indicating rich, such as time t12 shown in FIG. 3. The area that is integrated ends at a time when the upstream oxygen sensor (e.g., CMS sensor 127) switches from indicating lean to indicating rich, such as time t13 in FIG. 3. Method 500 integrates the difference between the voltages of the two oxygen sensors, or more general, a function of those voltages which may be expressed as:

$$\text{Slip\_area} = \int_{t_1}^{t_2} f1(VCMS) - f2(VTP)$$

where Slip_area is the area between the voltage output curves of the CMS sensor and the tailpipe oxygen sensor, t1 is the time that the tailpipe sensor switches from indicating lean to indicating rich, t2 is the time that the CMS switches from indicating lean to indicating rich, VCMS is the voltage output of the CMS, VTP is the voltage output of the tailpipe oxygen sensor, and the functions f1 and f2 map voltage to O2 mass flow.

Alternatively, in some examples, method 500 may determine a difference in time between when the tailpipe oxygen sensor switches from indicating lean to indicating rich and the time when the upstream oxygen sensor (e.g., CMS sensor 127) switches from indicating lean to indicating rich. The slip time may be determined via the following equation:

$$\text{Slip\_time} = t1 - t2$$

where Slip_time is the amount of time between the voltage output curves of the CMS sensor and the tailpipe oxygen sensor, t1 is the time that the tailpipe sensor switches from indicating lean to indicating rich, t2 is the time that the CMS switches from indicating lean to indicating rich. Method 500 proceeds to 514.

At 514, method 500 estimates the amount of $NH_3$ slip. In one example, method 500 estimates the amount of $NH_3$ slip via empirically determined functions that map the area or the time determined at 512 to $NH_3$ slip. The functions may be determined via operating an engine system on a dynamometer and recording $NH_3$ levels that occur during lean to rich air-fuel ratio changes of the engine. Method 500 may estimate $NH_3$ via the following equations:

$$NH3\text{slip} = f(\text{Slip\_area})$$

Or $$NH3\text{slip} = f(\text{Slip\_time})$$

where NH3slip is the estimated amount of $NH_3$ that slips or passes by the SCR and f is a function that returns the amount of $NH_3$ slip. The amount of $NH_3$ that has slipped past the SCR may be referred to as an estimate of actual $NH_3$ slip. The NH3_slip may be referred to as output of an observer since it is based on observed system output. Method 500 proceeds to 516.

At 516, method 500 determines an amount of modeled $NH_3$ slip. Method 500 may estimate the rate of change of $NH_3$ stored within the SCR via the following equation:

$$\frac{d}{dt}NH3Stored = NH3In(\text{Lambda}, ef, T) -$$
$$NH3Des(NH3Stored, SCRT, ef, \text{Lambda}) - NH3CVT(NOxSCR, T)$$

where d/dt NH3Stored is the rate of change of $NH_3$ that is stored in the SCR, NH3In is a function that returns the amount of $NH_3$ that enters the SCR, Lambda is the Lambda value the engine operates on, of is the exhaust flow rate, T is exhaust temperature, NH3Des is a function that returns the amount of $NH_3$ desorption, NH3Stored is the amount of $NH_3$ stored in the SCR, SCRT is SCR temperature, NH3CVT is a function that returns the amount of $NH_3$ that is converted to $N_2$ and $H_2O$, and NOxSCR is the amount of NOx flowing into the SCR. The modeled amount of $NH_3$ slip may be determined via the following equation:

$$NH3\text{SlipMod} = NH3Des(NH3Stored, SCRT, ef, \text{Lambda})$$

where NH3SlipMod is the modeled amount of $NH_3$ slip from the SCR and the variables are as previously described. The functions NH3In, NH3Des, and NH3CVT may be empirically determined via operating an engine on a dynamometer and recording emissions from the engine and tailpipe, or alternatively, they may be determined via equations. Method 500 proceeds to 518.

At 518, method 500 adjusts the amount of $NH_3$ that is estimated to be stored within the SCR. The amount of $NH_3$ that is estimated to be stored within the SCR may be determined via numerically integrating NH3In(Lambda,ef,T)−NH3Des(NH3Stored,SCRT,ef,Lambda)−NH3CVT(NOxSCR,T). The corrected amount of $NH_3$ stored in the SCR for static conditions may be determined via the following equation:

$$NH3\text{StorCor} = NH3\text{Stor} + K\text{cor} \cdot (NH3\text{slip} - NH3\text{SlipMod})$$

where NH3StorCor is the corrected amount of $NH_3$ stored in the SCR, NH3Stor is the uncorrected amount of $NH_3$ stored in the SCR, NH3slip is the estimated amount of $NH_3$ slip past the SCR, Kcor is a scalar gain (e.g., a real number between 0 and 1), and NH3SlipMod is the modeled amount of $NH_3$ slip past the SCR.

The corrected estimated amount of $NH_3$ stored in the SCR for dynamic conditions may be determined via the following equation:

$$\frac{d}{dt}NH3Stored =$$
$$NH3In(\text{Lambda}, ef, T) - NH3Des(NH3Stored, SCRT, ef, \text{Lambda}) -$$
$$NH3CVT(NOxSCR, T) + K\text{cor} \cdot (NH3\text{slip} - NH3\text{SlipMod})$$

where the variables are as previously described. The right hand side of this equation may be numerically integrated to determine the corrected amount of $NH_3$ that is stored in the SCR. Method 500 proceeds to 520.

At 520, method 500 adjusts an amount of fuel that is delivered to the engine according to the corrected amount of NH$_3$ that is stored in the SCR. In one example, if the corrected amount of NH$_3$ that is stored in the SCR is less than a first threshold, additional NH$_3$ may be generated via operating the engine at a rich air-fuel ratio so that more NH$_3$ may be stored in the SCR. If the corrected amount of NH$_3$ that is stored in the SCR is greater than a second threshold, generation of additional NH$_3$ may be ceased via operating the engine at a lean air-fuel ratio so that NH$_3$ may be utilized in the SCR. The first and second thresholds may be a function of SCR temperature.

Additionally, the NH$_3$ slip estimate NH3slip may be used to monitor the health and presence of the SCR system. Specifically, when the observer predicts NH$_3$ slip by a tailpipe oxygen sensor switch before the CMS by some time, but the observed tailpipe oxygen sensor switching event occurs after the switching of the CMS, this may indicate degradation in either in the SCR hardware, or the algorithms that predict NH$_3$ generation and desorption. Method 500 proceeds to exit.

In this way, two oxygen sensors may be a basis for an observer that corrects an estimated amount of NH$_3$ that is stored within a SCR. By improving the estimate of NH$_3$ that is stored in the SCR, it may be possible to reduce NH$_3$ slip and improve NOx conversion.

Referring now to FIG. 6, a second method for controlling NOx and NH$_3$ of a gasoline vehicle that is equipped with a SCR and a NOx or NH$_3$ sensor that is based on a second observer is shown. The method of FIG. 6 may be incorporated into and may cooperate with the system of FIG. 1. Further, at least portions of the method of FIG. 6 may be incorporated as executable instructions stored in non-transitory memory of controller 12 while other portions of the method may be performed via a controller transforming operating states of devices and actuators in the physical world.

At 602, method 600 determines operation conditions. Operating conditions may include but are not limited to ambient temperature, engine temperature, engine speed, barometric pressure, engine intake manifold temperature, SCR temperature, operating states of oxygen sensors, NOx sensors, and NH$_3$ sensors, and driver demand torque. The engine operating conditions may be determined via the various sensors described herein. Method 600 proceeds to 604.

At 604, method 600 determines the amount of NH$_3$ slip that passes through the SCR. Method 600 determines the amount of NH$_3$ slip that passes through the SCR via the NH3 or NOx sensor that is positioned downstream of the SCR. Method 600 proceeds to 606.

At 606, method 600 judges if NH$_3$ slip is present. If so, the answer is yes and method 600 proceeds to 608. Otherwise, the answer is no and method 600 proceeds to 607.

At 607, method 600 determines a corrected amount of NH3 stored in the SCR during static conditions. The corrected amount of NH$_3$ stored in the SCR for static conditions may be determined via the following equation:

$$NH3StorCor = NH3Stor + Kcor*(NH3meas - NH3SlipMod)$$

where NH3StorCor is the corrected amount of NH$_3$ stored in the SCR, NH3Stor is the uncorrected amount of NH$_3$ stored in the SCR, NH3measured is the measured amount of NH$_3$ that slips past the SCR as determined via the NH$_3$ or NOx sensor, Kcor is a scalar gain (e.g., a real number between 0 and 1), and NH3SlipMod is the modeled amount of NH$_3$ slip past the SCR as previously described. Method 600 proceeds to 610.

At 608, method 600 determines the corrected estimated amount of NH$_3$ stored in the SCR for dynamic conditions via the following equation:

$$\frac{d}{dt}NH3Stored = NH3In(\text{Lambda}, ef, T) - NH3Des(NH3Stored, SCRT, ef, \text{Lambda}) - NH3CVT(NOxSCR, T) + Kcor \cdot (NH3meas - NH3SlipMod)$$

where the variables are as previously described. The right hand side of this equation may be numerically integrated to determine the corrected amount of NH$_3$ that is stored in the SCR. Method 600 proceeds to 610.

At 610, method 600 adjusts an amount of fuel that is delivered to the engine according to the corrected amount of NH$_3$ that is stored in the SCR. In one example, if the corrected amount of NH$_3$ that is stored in the SCR is less than a first threshold, additional NH$_3$ may be generated via operating the engine at a rich air-fuel ratio so that more NH$_3$ may be stored in the SCR. If the corrected amount of NH$_3$ that is stored in the SCR is greater than a second threshold, generation of additional NH$_3$ may be ceased via operating the engine at a lean air-fuel ratio so that NH$_3$ may be utilized in the SCR. The first and second thresholds may be a function of SCR temperature.

Additionally, the measured NH$_3$ slip NH3meas may be used to monitor the health and presence of the SCR system. Specifically, when the second observer predicts NH$_3$ slip is greater than the first threshold, but the observed or measured NH$_3$ slip is less than the second threshold, this may indicate degradation (e.g., performance that is less than may be expected) in either in the SCR hardware, or the algorithms that predict NH$_3$ generation and desorption. Method 600 proceeds to exit.

In this way, a NOx or NH$_3$ sensors may be a basis for a second observer that corrects an estimated amount of NH$_3$ that is stored within a SCR. By improving the estimate of NH$_3$ that is stored in the SCR, it may be possible to reduce NH$_3$ slip and improve NOx conversion.

Thus, the methods of FIGS. 5 and 6 provide for a method for operating an engine, comprising: estimating an amount of NH$_3$ stored in a selective catalytic reductant catalyst (SCR) via a controller; correcting the amount of NH$_3$ stored in the SCR via the controller in response to output of first oxygen sensor and output of a second oxygen sensor; and adjusting an amount of fuel injected to an engine via the controller according to the corrected amount of NH$_3$ stored in the SCR. The method further comprises delivering a rich air-fuel ratio to an engine to correct the amount of NH$_3$ stored in the SCR. The method further comprises correcting the output of the first oxygen sensor and output of the second oxygen sensor for voltage offsets. The method further comprises correcting the amount of NH$_3$ stored in the SCR via integrating a difference between the output of the first oxygen sensor and output of the second oxygen sensor. The method further comprises correcting the amount of NH$_3$ stored in the SCR based on the integrated difference between the output of the first oxygen sensor and output of the second oxygen sensor.

In some examples, the method further comprises correcting the amount of NH$_3$ stored in the SCR based on an estimated amount of NH$_3$ slip past the SCR. The method includes where adjusting the amount of fuel injected to the engine includes enriching an engine air-fuel in response to the corrected amount of $NH_3$ stored in the SCR being less than a first threshold. The method includes where adjusting the amount of fuel injected to the engine includes leaning an engine air-fuel in response to the corrected amount of $NH_3$ stored in the SCR being greater than a second threshold. The method includes where the first threshold and the second threshold are functions of SCR temperature.

The methods of FIGS. 5 and 6 also provide for a method for operating an engine, comprising: estimating an amount of $NH_3$ stored in a selective catalytic reductant catalyst (SCR) via a controller; correcting the amount of $NH_3$ stored in the SCR via the controller in response to output of first oxygen sensor and output of a second oxygen sensor; and indicating SCR degradation to a vehicle occupant or service center via the controller in response to an observer predicting $NH_3$ slip by the second oxygen sensor switch before the first oxygen sensor switches, but where second oxygen sensor switches state after the first oxygen sensor switches state. The method further comprises adjusting engine operation in response to the observer predicting $NH_3$ slip by the second oxygen sensor switch before the first oxygen sensor switches, but where second oxygen sensor switches state after the first oxygen sensor switches state. The method includes where adjusting engine operation includes adjusting fuel injection timing and/or spark timing of the engine. The method further comprises generating a $NH_3$ storage correction amount via the observer. The method includes where the observer generates the $NH_3$ storage correction amount via output of the first oxygen sensor and output of the second oxygen sensor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, I6, V6, V8, V10, and V12 engines operating in natural gas, gasoline, or alternative fuel configurations could use the present description to advantage.

The invention claimed is:

1. A method for operating an engine, comprising:
   estimating an amount of $NH_3$ stored in a selective catalytic reductant catalyst (SCR) via a controller;
   correcting the amount of $NH_3$ stored in the SCR via the controller in response to output of a first oxygen sensor and output of a second oxygen sensor, where correcting the amount of $NH_3$ stored in the SCR includes integrating a difference between the output of the first oxygen sensor and the output of the second oxygen sensor, where correcting the amount of $NH_3$ stored in the SCR includes adjusting an amount of $NH_3$ stored in the SCR based on a difference between an estimated $NH_3$ slip and modeled $NH_3$ slip, where the estimated $NH_3$ slip is based on a slip time or a slip area, and where the modeled $NH_3$ slip is based on exhaust flow, a temperature of the SCR, and a Lambda value; and
   adjusting an amount of fuel injected to the engine via the controller according to the corrected amount of $NH_3$ stored in the SCR.

2. The method of claim 1, further comprising delivering a rich air-fuel ratio to the engine to correct the amount of $NH_3$ stored in the SCR.

3. The method of claim 2, further comprising correcting the output of the first oxygen sensor and the output of the second oxygen sensor for voltage offsets.

4. The method of claim 1, further comprising correcting the amount of $NH_3$ stored in the SCR based on an estimated amount of $NH_3$ slip past the SCR.

5. The method of claim 1, where adjusting the amount of fuel injected to the engine includes enriching an engine air-fuel in response to the corrected amount of $NH_3$ stored in the SCR being less than a first threshold.

6. The method of claim 5, where adjusting the amount of fuel injected to the engine includes leaning an engine air-fuel in response to the corrected amount of $NH_3$ stored in the SCR being greater than a second threshold.

7. The method of claim 6, where the first threshold and the second threshold are functions of SCR temperature.

8. A method for operating an engine, comprising:
   estimating an amount of $NH_3$ stored in a selective catalytic reductant catalyst (SCR) via a controller;
   correcting the amount of $NH_3$ stored in the SCR via the controller in response to an output of a first oxygen sensor and an output of a second oxygen sensor, where correcting the amount of $NH_3$ stored in the SCR includes adjusting an amount of $NH_3$ stored in the SCR based on a difference between an estimated $NH_3$ slip and modeled $NH_3$ slip, where the estimated $NH_3$ slip is based on a slip time or a slip area, and where the modeled $NH_3$ slip is based on exhaust flow, a temperature of the SCR, and a Lambda value; and
   indicating SCR degradation to a vehicle occupant or service center via the controller in response to an observer predicting $NH_3$ slip.

9. The method of claim 8, further comprising adjusting engine operation in response to the observer predicting $NH_3$ slip by the second oxygen sensor switch before the first oxygen sensor switches, but where second oxygen sensor switches state after the first oxygen sensor switches state.

10. The method of claim 9, where adjusting engine operation includes adjusting fuel injection timing and/or spark timing of the engine.

11. The method of claim 8, further comprising generating a $NH_3$ storage correction amount via the observer.

12. The method of claim 11, where the observer generates the $NH_3$ storage correction amount via the output of the first oxygen sensor and the output of the second oxygen sensor.

\* \* \* \* \*